United States Patent [19]

Kalantzis et al.

[11] Patent Number: 5,795,511
[45] Date of Patent: Aug. 18, 1998

[54] METHOD AND APPARATUS FOR CONTROLLING INJECTION-MOLDING SYSTEMS

[75] Inventors: Peter G. Kalantzis, Woodridge, Ill.; J. Howard Smith, Greenfield, Wis.

[73] Assignee: Fast Heat, Inc., Elmhurst, Ill.

[21] Appl. No.: 468,711

[22] Filed: Jun. 6, 1995

[51] Int. Cl.[6] .................. B29C 45/72; B29C 45/78
[52] U.S. Cl. .................. 264/40.6; 264/328.14; 425/144; 425/548; 364/475.06; 364/475.07
[58] Field of Search .................. 264/40.1, 40.6, 264/328.1, 328.14, 328.15, 328.16; 425/143, 144, 547, 548, 549; 364/468, 476, 475.05, 475.06, 475.07

[56] References Cited

U.S. PATENT DOCUMENTS

| | | | |
|---|---|---|---|
| 4,821,198 | 4/1989 | Takeuchi et al. | 364/468 |
| 4,841,459 | 6/1989 | Ikeda et al. | 364/476 |
| 5,166,884 | 11/1992 | Maney et al. | 364/468 |
| 5,222,026 | 6/1993 | Nakamoto | 364/476 |

FOREIGN PATENT DOCUMENTS

| | | | |
|---|---|---|---|
| 3330703 | 3/1985 | Germany | 364/476 |
| 3837713 | 5/1990 | Germany | 264/40.1 |
| 60-58826 | 4/1985 | Japan | 364/746 |
| 61-53020 | 3/1986 | Japan | 364/476 |
| 2169420 | 7/1986 | United Kingdom | 364/476 |
| 06322 | 11/1986 | WIPO | 364/476 |

Primary Examiner—Jill L. Heitbrink
Attorney, Agent, or Firm—Leydig, Voit & Mayer, Ltd.

[57] ABSTRACT

Apparatus and method for providing material to a mold, such as in an injection molding system, wherein the settings for controlling the molding operation are retained in a non-volatile memory in a hot-half of the mold. When connected to a system controller, the hot-half of the mold is configured to communicate the retained information to the system controller, thereby enabling simplified set up of the molding operation. The retained information includes system information, initial settings for a plurality of heating zones, and historical information associated with that particular hot-half of the mold. Changes made to the information at the system controller are transmitted to the hot-half for dynamic updating of the non-volatile memory.

18 Claims, 9 Drawing Sheets

System Information

| SOFTWARE VERSION NUMBER |
| --- |
| DEFAULT TEMP. UNIT C or F |
| NUMBER OF ACTUAL ZONES |

FIG. 6A

Zone Information (one per each actual zone)

| ZONE NUMBER |
| --- |
| ZONE NAME |
| TEMPERATURE SETPOINT |
| TEMPERATURE LOW RANGE |
| TEMPERATURE HIGH RANGE |
| ALARM BAND |
| ABORT BAND |
| ABORT TYPE |
| POWER SETPOINT |
| POWER LOW RANGE |
| POWER HIGH RANGE |
| CONTROL TYPE |
| SENSOR INPUT |
| SLAVE TO |
| BOOST AUTO TEMP. SETPOINT |
| BOOST AUTO POWER SETPOINT |
| BOOST AUTO TIMER |
| BOOST MANUAL TEMP. SETPOINT |
| BOOST MANUAL POWER SETPOINT |
| BOOST MANUAL TIMER |
| IDLE AUTO TEMP. SETPOINT |
| IDLE MANUAL POWER SETPOINT |
| IDLE AUTO TIMER |
| IDLE MANUAL TEMP. SETPOINT |
| IDLE MANUAL POWER SETPOINT |
| IDLE MANUAL TIMER |

FIG. 6B

Mold Setup Sheet

| |
|---|
| MOLD NUMBER |
| PART NUMBER |
| MACHINE NUMBER |
| MATERIAL TYPE |
| MATERIAL LOT |
| OPERATOR NAME |
| WATER TEMPERATURE |
| CLAMP PLATE TEMPERATURE |
| MANIFOLD PLATE TEMPERATURE |
| "A" PLATE TEMPERATURE |
| "B" PLATE TEMPERATURE |
| SLIDES TEMPERATURE |
| HIGH PRESSURE |
| LOW PRESSURE |
| BACK PRESSURE |
| HIGH PRESSURE TIME |
| LOW PRESSURE TIME |
| BACK PRESSURE TIME |
| MOLD CLOSE TIME |
| OVERALL CYCLE TIME |
| SCREW RPM |

SYMPHONY
2000 series control system

STOP | RUN | BOOST | IDLE

SYSTEM RUN MODE    ALARM    ? HELP

SET UP MENU

ZONE SET | FILES | °F DEGREE | TEMP | 96 ZONES

— 44
— 42

Zone Number [55]   Zone Name [Zone 55]

Temp. Setpoint [500]   Power Setpoint % [10]   Control Type [Auto]

Temp. Low Limit [0]   Power Low Limit % [0]

Temp. High Limit [999]   Power High Limit % [100]

Idle Auto Temp Setpoint [400]   Boost Auto Temp Setpoint [600]

Idle Auto Power Setpoint [5]   Boost Auto Power Setpoint [15]

Idle Auto Timer [1]   Boost Auto Timer [0]

Idle Manual Temp Setpoint [400]   Boost Manual Temp Setpoint [600]

Idle Manual Power Setpoint [5]   Boost Manual Power Setpoint [15]

Idle Manual Timer [1]   Boost Manual Timer [1]

Sensor Input [55]   Slave to [55]   Material Automation Setpoint [0]

Temperature Alarm Band [30]

Temperature Abort Band [50]

[Save]   [Continue]

5,795,511

1

METHOD AND APPARATUS FOR CONTROLLING INJECTION-MOLDING SYSTEMS

FIELD OF THE INVENTION

The invention relates generally to injection molding systems, and more particularly to a method and apparatus for controlling injection-molding systems.

BACKGROUND OF THE INVENTION

Injection molding systems for forming objects are typically arranged such that one portion, into which appropriately-shaped molds have been machined, known as a cold-half, is mated with another portion, or hot-half, containing heating elements for liquefying and/or maintaining injected molding material in a liquid phase. The hot-half is arranged to be connected to an injection system such as an extruder and contains a manifold or the like providing flow passages for the liquefied material to reach those molds. Because the material should be maintained within a relatively narrow temperature range for optimal molding results, e.g., within five-to-ten degrees Centigrade when injecting at temperatures on the order of several hundred degrees Centigrade, the hot-half often includes suitably-positioned thermocouples such that the temperatures at various locations proximate the flow passages (i.e., "zones") may be monitored and adjusted.

Microprocessor-based controllers for monitoring the temperatures and/or adjusting the heating elements have recently been employed to simplify the molding process. For example, the Symphony™ system, available from Fast Heat, Inc., Elmhurst, Illinois, and the assignee of the present invention, provides a personal computer-based system controller that controls and monitors the temperature settings in up to ninety-six locations or zones of the hot-half. Once set, the system controller is capable of adjusting the heating elements in accordance with readings obtained by corresponding thermocouples on a zone-by-zone basis, thereby providing closed-loop control for maintaining desired temperatures.

The temperatures in each zone, however, typically cannot simply be set to an initial value and left alone, but rather some adjustment is usually required to ensure a reliable molding process. For example, thermal coupling among the several heating elements is difficult to precisely predict and may cause, via conduction and/or convection, one zone to be hotter or cooler than expected. Consequently, adjustments to the initial temperature settings of the various zones are typically necessary to heat the various zones in a manner that facilitates proper formation of the objects from the material injected into the mold. Additionally, the temperature zones of the hot-half are generally not uniformly sized or positioned with respect to one another. Therefore, the thermocouple and heater may control the temperature in one zone more precisely than the thermocouple and heater of another zone.

Moreover, the optimal settings for a particular hot-half may vary over time due to a number of considerations. For example, the settings that are adequate for one type of molding material are generally not adequate for another. Other factors include the previous pressure settings, extrusion rates, and the age of the hot-half. As a result, a skilled operator is required to fine tune the temperature settings of the zones for each molding operation, complicating matters, the hot-half of the molds are often taken out of service for maintenance, moved to different locations in a manufacturing plant, and shipped from plant to plant. In contrast, the controllers ordinarily remain at one location while the mold is moved. Thus, there is no certainty that a given controller will be used with a given hot-half of a mold for the life of the mold.

A hot-half is formed from a substratum of a steel block, which is machined to accommodate heating elements and thermocouples. Passageways are also machined into the steel block to accommodate the flow of liquefied material. Other passageways are machined to communicate wiring to and from the heating elements and thermocouples.

Because of the complexities of the thermal transfer characteristics of the steel block from which the hot-half is formed, the initial settings for the temperatures of the heating elements are typically only approximations. Precise settings for the temperature of the heating elements is typically accomplished using an empirical approach. For example, from initial temperature settings, test products are made from the mold. Temperature settings for the heating elements are then varied using an iterative process in order to determine the temperature settings that provide the best quality molded product. Determining the best temperature settings for a new mold using an iterative process from initial temperature settings may take several hours to complete.

Thus, to facilitate the initial temperature settings, the hot-half of the molds are often shipped with a written list of settings, or a list recorded on a floppy disk. The written list is input by an operator into the system controller, or the floppy disk is read by the system controller and the settings electronically made in accordance therewith. Alternatively, a database of settings may be kept and accessed; however, this requires access to a storage facility, regular database maintenance, and more sophisticated operator training procedures.

Regardless of which technique for recording the settings is used, problems in matching the recorded data to the corresponding hot-half may occur. Indeed, lost or damaged written instructions or transfer disks, an incorrectly identified or lost database file, or other similar problems are likely to occur and will result in operators having to start-up and operate the process without the benefit of the recorded information, costing a significant amount of time and effort.

SUMMARY OF THE INVENTION

The general aim of the present invention is to provide an improved method and apparatus for controlling the temperature of a hot-half of a mold during the injection molding process which provides for more reliable and simplified operation.

A more particular aim of the invention is to ensure that the most recent temperature settings for a hot-half of a mold can be easily retrieved at any time and at any place.

A further object of the invention is to memorialize updated temperature settings for a hot-half of a mold in a manner that can be automatically retrieved by subsequent users of the mold regardless of whether the mold is used with the same controller.

Yet another object of the invention is to create a history of the mold usage and to record the most recent temperature settings for the hot-half of the mold that can be easily accessible wherever the mold is used, regardless of its location and the time of its use.

Still another object is to eliminate problems that occur from mismatching or losing the setup data for a mold.

BRIEF DESCRIPTION OF THE DRAWINGS

Other objects and advantages of the present invention will become apparent upon reading the following detailed description and upon reference to the drawings in which.

While the invention is susceptible to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Figure 1:
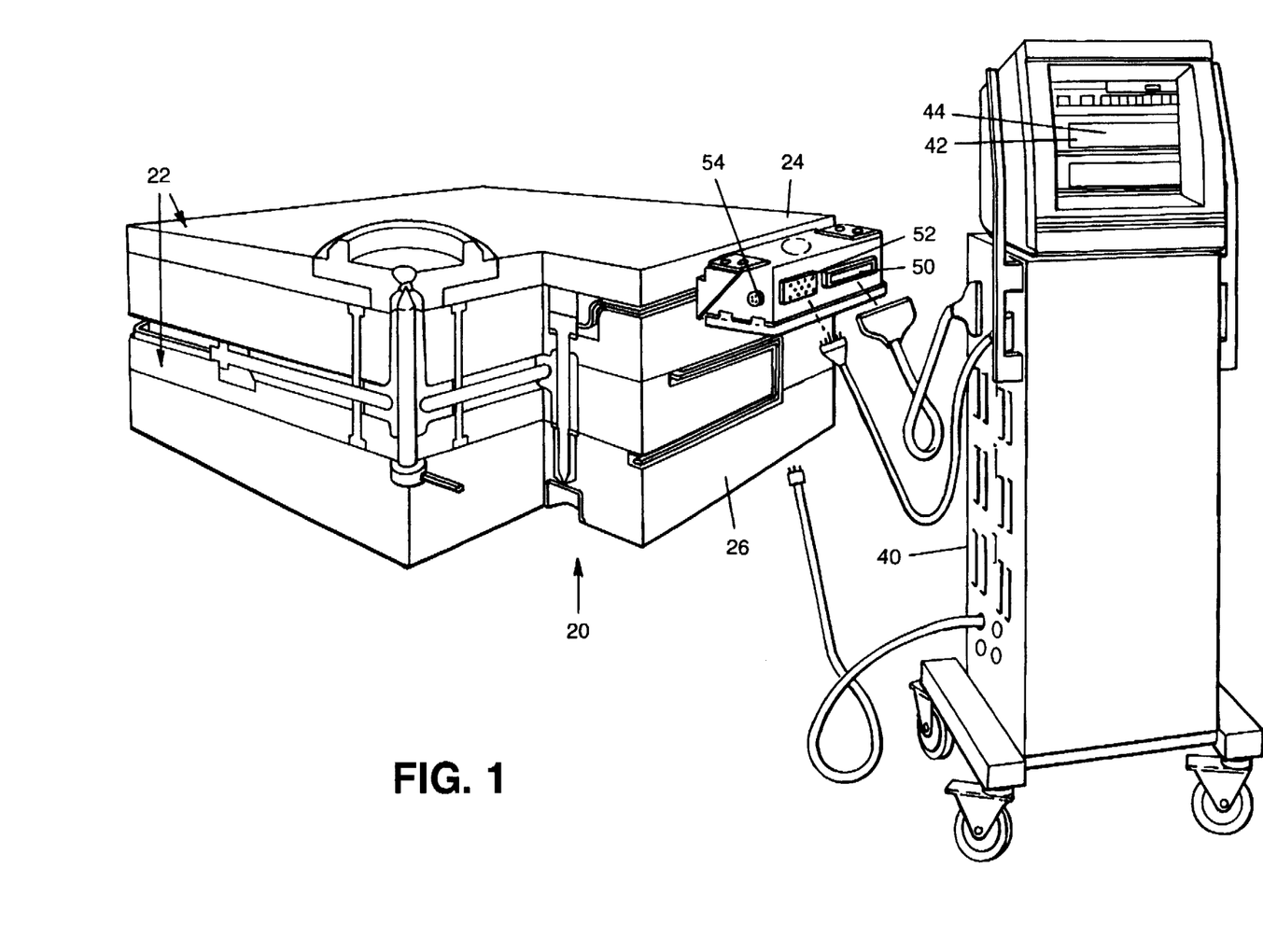
FIG. 1 is a perspective view of a molding system having a hot-half coupled to a cold-half and arranged for connection to a system controller.
Figure 2:
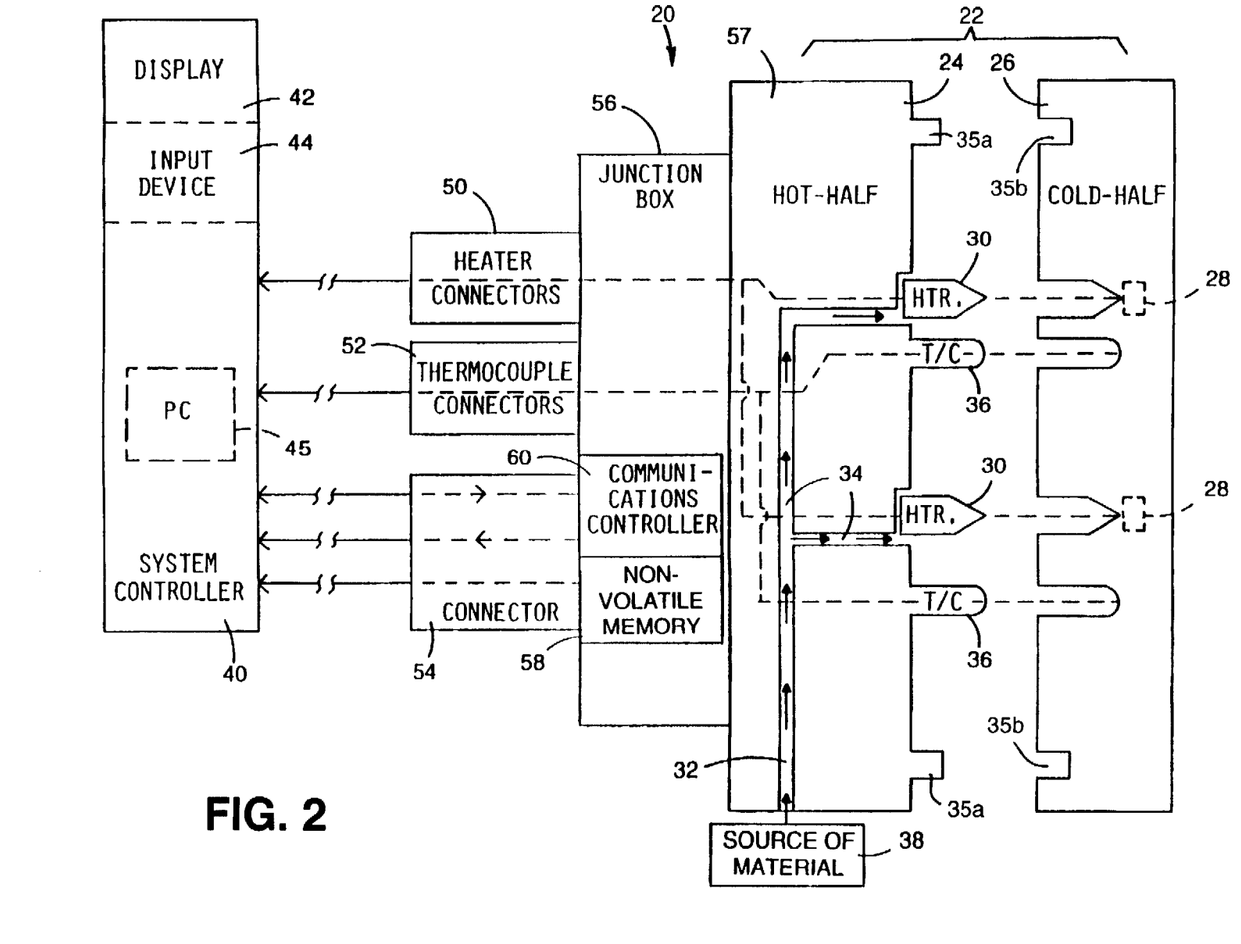
FIG. 2 is a block diagram illustrating the components of the system of FIG. 1.

Turning to the drawings and referring FIGS. 1 and 2, there is shown a molding system generally designated 20 into which the present invention has been incorporated. The system 20 includes a molding apparatus 22 comprising a hot-half 24 and a cold-half 26. As is conventional, the cold half 26 includes one or more molds 28 which have been appropriately machined or otherwise formed in the shape of the object or objects to be molded.

As best shown in the diagram of FIG. 2, the hot-half 24 includes one or more heating elements, or heaters 30 suitably positioned to liquefy and/or maintain the injected material in a liquid form. To convey the material to the molds 28, a flow passage 32, which may include a manifold 34 for dividing the liquefied material, is present within the hot-half 24. As such, the flow passage 32 may have heaters associated therewith. The hot-half 24 also includes pins 35a which fit into receiving holes 35b on the cold-half 26, to thereby assist with proper registration between the two mold halves.

For monitoring the temperature, as described in more detail below, thermocouples 36 are provided and may be advantageously positioned near a corresponding heater in a conventional manner. A preferable alternative is to combine each of the thermocouples 36 with a corresponding heater 30 in an integral unit. To inject the material, a source of material 38 is provided and may comprise an injection means such as a screw driven extruder, pump or other pressure driven type of system.

Figure 3A:
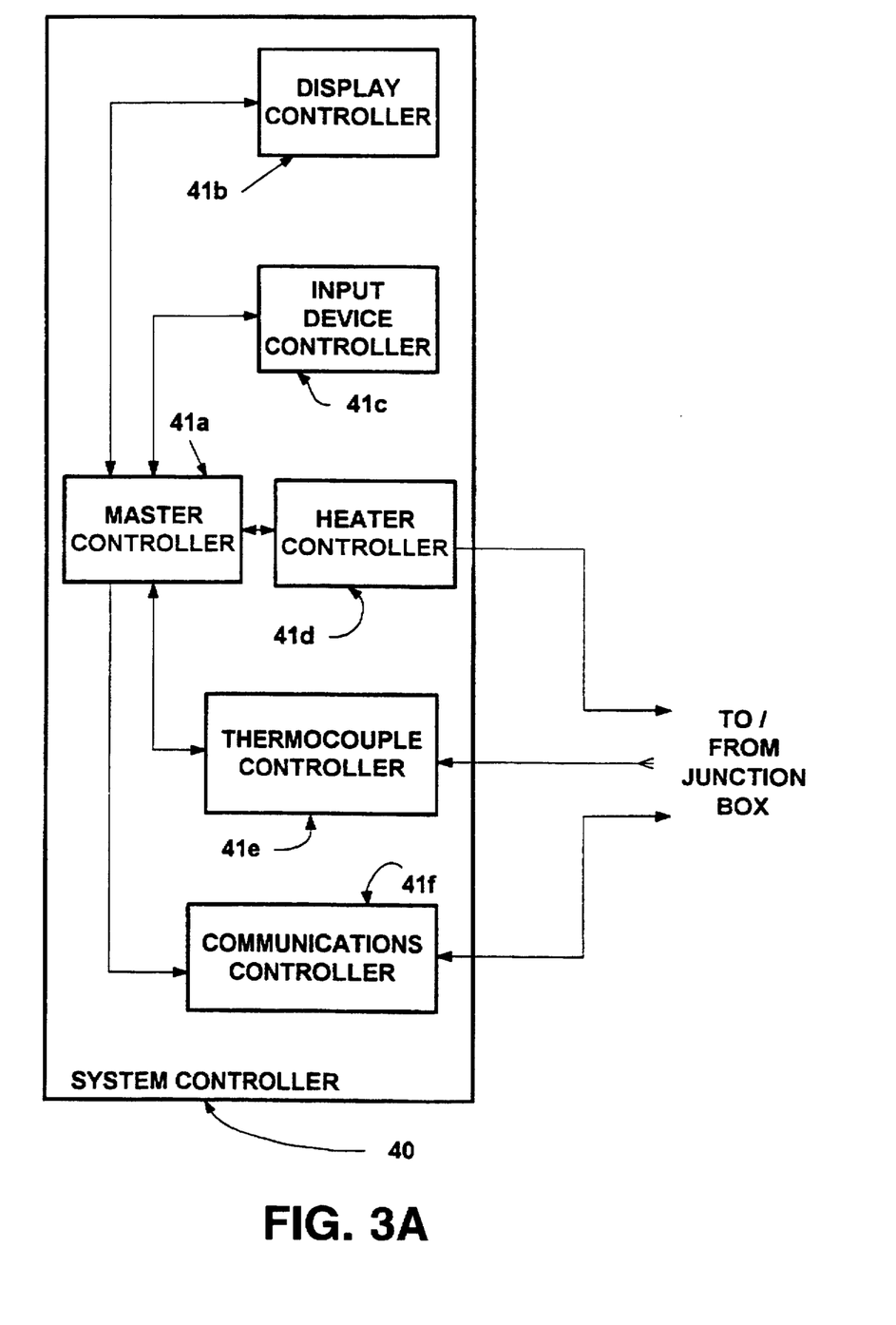
FIG. 3A is a block diagram illustrating the control functions handled by the system controller.

For controlling the molding operation, and in particular the controlled energization of the heaters 30 of the hot-half 24, a system controller 40 is provided. The system controller 40, is preferably a Symphony™ series control system, commercially available from Fast Heat, Inc., Elmhurst, Ill. As shown in FIG. 3A, the system controller 40 is configured to function as a master controller 41a, which coordinates a display controller 41b, an input device controller 41c, a heater controller 41d, a thermocouple controller 41e and a communications controller 41f. The display controller controls a display screen 42 and interfaces it to the other controllers via the master controller 41a. The input device controller 41c interfaces the system controller 40 to an input device 44, which can be a keyboard, mouse or a touch screen. The heater controller 41d includes power electronics responsive to the master controller 41a for providing controlled power in the form of electrical currents to the heating elements 30 in order to heat the zones of the hot-half 24. The thermocouple controller 41e interfaces signals from the thermocouples 36 to the master controller 41a. Finally, the communications controller 41f is a transceiver for coupling the system controller 40 to the hot-half 24. The transceiver of the communications controller 41f is RS-232 compatible.

To realize the various controllers, the preferred system controller 40 is in the form of the above-identified Symphony™ control system and includes a personal computer 45 having a conventional Intel® 386 (or better) microprocessor, at least two megabytes of random access memory (RAM) and conventional input/output (I/O) devices including hard and/or floppy disk drives and serial and parallel output ports. The preferred system controller 40 also includes a super video graphics adapter (VGA) display screen 42, and an input device 44 which is advantageously arranged as a touch-screen sensing system. The Symphony™ series control system is capable of controlling the energization of up to ninety-six heaters, disposed in various locations known as zones, in one or more hot-half devices.

To energize the heaters 30, the system controller 40 provides output power signals, i.e., currents, which are delivered to the heaters 30 in the hot-half 24. In addition, the system controller 40 receives the temperature-dependent signals from the thermocouples 36. In this manner, the system controller 40 controls the heating of the hot-half 24 in a closed-loop manner. As with the heaters 30, up to ninety-six thermocouples 36 may be monitored with the preferred Symphony™ controller. Of course, if desired, the heaters 30 may be simply energized by the system controller 40 without closed-loop control thereof.

Figure 3B:
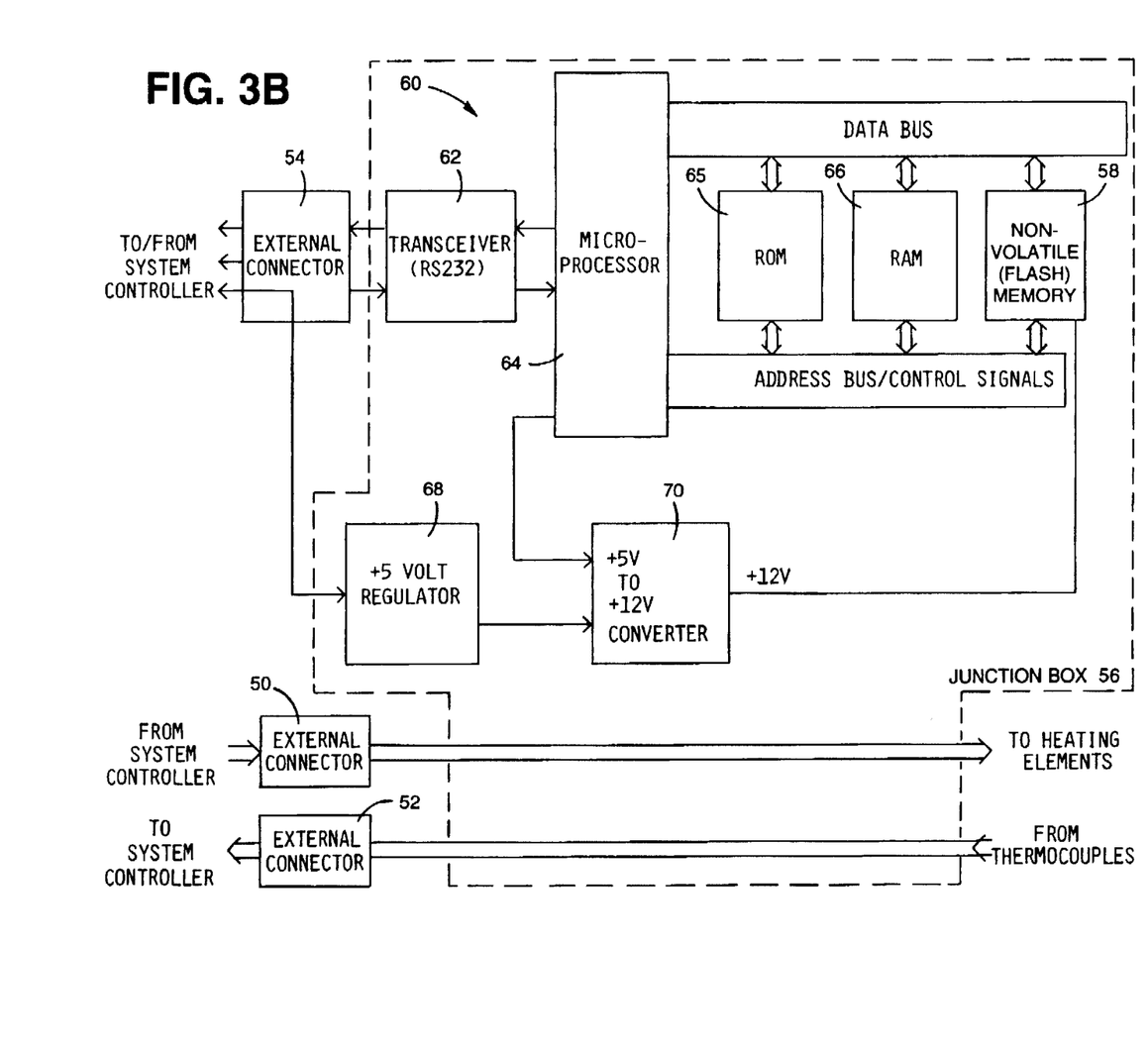
FIG. 3B is a block diagram of the circuitry present in the hot-half for storing data with the mold according to the invention and communicating the data to the system controller.

As shown in FIGS. 1-3, the system controller 40 connects to the hot-half 24 via detachable connectors 50, 52 and 54. The connectors 50, 52 and 54 are preferably constructed in a junction box 56 mounted directly to the hot-half 24. Ordinarily, the junction box 56 is attached to the side of the block of metal, or substrate 57, that forms the general structure of the hot-half 24. Such a side-location is accessible and does not interfere with the mating of the hot-half to the cold-half 26. In such a configuration, the hot-half 24 is mechanically structured and electrically arranged (via electrical ports for its heaters 30 and thermocouples 36) to have a junction box 56 attached thereto. The detachable connectors 50, 52 and 54 that connect the hot-half 24 to the system controller 40 allow any system controller 40 to be connected with any appropriately configured hot-half 24, providing significant interchangability and flexibility.

In accordance with one aspect of the invention, the hot-half 24 stores information specific to itself, including the parameters for approximating optimal operation of the hot-half 24. As described in more detail below, the hot-half 24 communicates this information to the system controller 40, which then uses the information for controlling the molding process. For example, the system controller 40 uses the operating parameters received from the hot-half 24 to initially set the heaters to desired temperatures in hot-half 24. As can be appreciated, the information specific to that hot-half 24 thus remains with the hot-half 24, thereby simplifying start-up while eliminating the possibility of lost or mismatched hot-half data.

To store the information, as best shown in FIG. 3B, the junction box 56 that remains with the hot-half 24 includes a non-volatile memory 58 such as an electrically erasable/programmable read only memory (EEPROM) or flash memory, or battery backed up RAM. However, it is preferable to employ an EEPROM to eliminate any need to change or recharge batteries. In the preferred system, up to 256 kilobytes are provided, however other sizes are feasible depending on the application. The non-volatile memory 58 enables the information to be retained with the hot-half 24 when the system controller 40 is detached therefrom.

Although it is feasible to employ a system wherein the system controller 40 directly accesses the nonvolatile memory 58, it is preferable to include communications circuitry 60 on the hot-half 24. This enables the use of serial communication, providing numerous advantages including the reduction of connector size, incorporation of error detection capabilities, and isolation of the non-volatile memory 58 from the connector 54. Moreover, having serial communication enables a stand-alone personal computer or the like (not shown) to be easily configured to access the memory 58, rather than requiring a specially configured system controller. Finally, having serial communication enables wireless communication, e.g., via infrared or radio frequency (RF) signals, although with a wireless system power will otherwise need to be supplied to the circuitry 60.

As shown in FIG. 3B, the communications circuitry 60 includes a transceiver 62 configured for RS-232 serial communication. A microprocessor 64, preferably in the Intel 8051 family of microprocessors, is connected in a known manner to the transceiver 62 to receive and send data. A read only memory (ROM) 65, thirty-two kilobytes in size, provides the executable code that controls the communications as described in more detail below. Two kilobytes of conventional RAM 66 is present as needed by the executable code, for example to buffer received messages and to provide temporary storage for variables and flags.

Power in the form of eight-to-fifteen volts DC is provided to the communications circuitry by the system controller 40 (or another source such as a personal computer or battery) through connector 54. A five-volt regulator 68 conditions the input voltage. A five-to-twelve volt DC converter 70 is provided and operated by the microprocessor 64 to selectively write the EEPROM 58. Although not necessary to the invention, because of the possibility of conductive heating of the junction box 56, the junction box 56 is vented (not shown) and the electrical components disposed therein are selected for being able to operate up to 105 degrees Centigrade.

Figure 4:
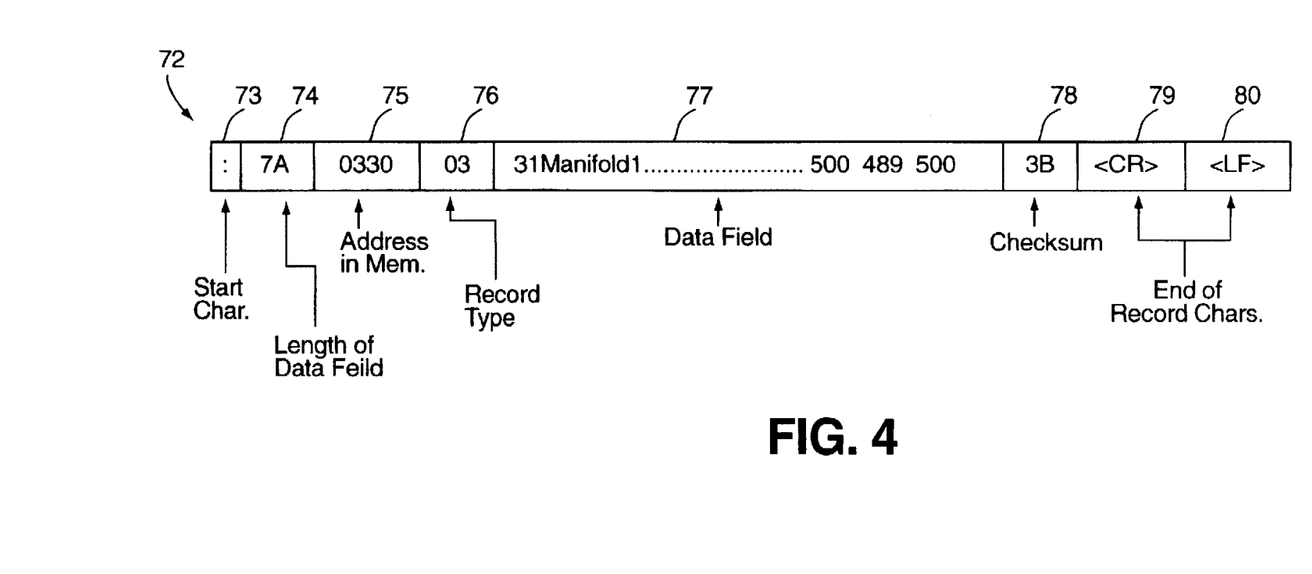
FIG. 4 is a representation of a formatted data record utilized in communicating information between the communications circuitry in the hot-half and the system controller.

For transferring information between the system controller 40 and the communications circuitry 60 in the hot-half 24, an agreed upon protocol in the form of a formatted record 72 is employed. As best shown in FIG. 4, the record 72 is comprised of eight hexadecimal fields 73–80. The field 73 is a one-byte start of record character, arbitrarily selected as a colon, followed by two-byte field 74 reserved for the length of the data field 77, which may be zero if no data is required as established by the record type. Field 75 represents the address in the non-volatile memory 58 to which write requests are directed—i.e., an address within a memory page as described below.

Field 76 is reserved for the type field, which, as described below, generally is used in conjunction with the data field 77. When a hexadecimal value of 00h is present in this field, the protocol indicates that the record field 77 contains data, and thus the data transmitted in field 77 is to be written to the non-volatile memory 58. With a data record, the start address within the sixty-four kilobyte page is included in field 75.

A hexadecimal value of 02h in the type field 76 indicates an extended address record. When transmitted, type field 76 indicates that the address passed in data field 77 represents a sixteen-bit paragraph number. Each time this record type is received, the communications circuitry 60 thus offsets its starting paragraph so that subsequent data records are written to the transmitted location (in the address field 75) on the proper page. As can be appreciated, with this convention, up to one megabyte of storage space is addressable for writing operations.

A hexadecimal value equal to 03h in field 76 notifies the communications circuitry that the system controller desires to read the contents of the memory. With this record type, the data field 77 is used to pass the absolute starting address of the data (i.e., direct addressing of up to one megabyte) and the number of bytes to be read and returned by the communications circuitry 60. If more than sixty-four kilobytes are requested, the communications circuitry 60 will respond with extended addresses at the paragraph boundaries, in a manner similar to that previously described for data (write) records.

A hexadecimal value of 04h in field 76 indicates that the non-volatile memory is to be erased. No other data is sent with this record. Finally, a hexadecimal value of 05h is reserved for future use, in particular to indicate a request for status information. However, at present no status information is currently returned.

Field 78 in the record 72 of FIG. 4 is utilized for error checking, by providing a checksum value for the fields 74–77. As described in more detail below, the received checksum is evaluated against a checksum calculated from the data received in fields 74–77 to verify the integrity of the transmission. Finally, fields 79 and 80 are conventional carriage-return line-feed pairs that indicate the end of the record.

Figure 5:
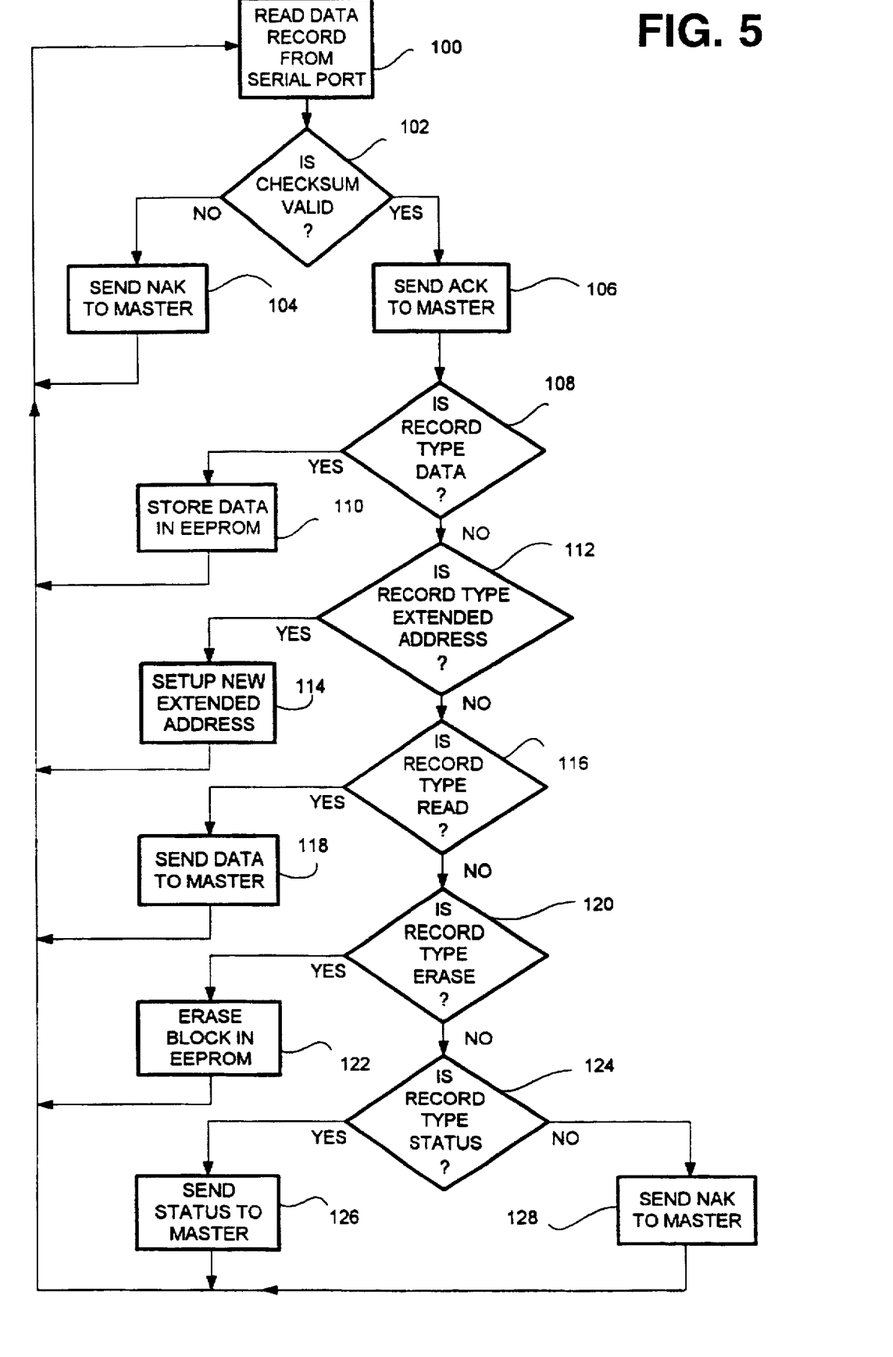
FIG. 5 is a flow diagram representing the general steps taken by the communications circuitry in the hot-half when a transmitted record is received from the system controller.

Turning now to an explanation of the operation of the invention with particular reference to the flow diagram of FIG. 5, upon receipt of a communication from the system controller 40, at step 100 the communications circuitry 60 reads the record transmitted thereto. Although not necessary to the invention, at step 102 the communications circuitry 60 performs a conventional checksum operation for error checking purposes that corresponds to the checksum field 78 transmitted with the record 72 as previously described. If the calculated sum does not match the received sum, at step 104 the communications circuitry 60 returns a negative acknowledge to the master, i.e., the system controller 40 or personal computer connected thereto, to indicate an error in transmission. Conversely, if checksum does match, at step 106 the communications circuitry 60 returns an acknowledge to the system controller 40 (master) to indicate a properly received record.

The type field 76 of the record 72 is then serially evaluated to determine the operation that the record is requesting. As described above, if the type field equals 00h, then the record 72 is a data record and the system controller 40 is requesting a write operation be performed by the microprocessor 64. At step 108, this request is detected and the routine branches to step 110 where the data transmitted in the field 77 is stored in the non-volatile memory 58.

If the type field 76 does not equal 00h, then at step 112 the type is evaluated to determine if it is an extended address record (02h). If so, at step 114 the routine adjusts its page pointer to the address received so that subsequently received transmissions will be directed to the appropriate page. If not, the process continues to step 116.

At step 116, the record type in field 76 is compared against 03h to determine whether a read request has been received. If the field was equal to a 03h, then the microprocessor 64 handles the read request as described above at step 118, by accessing the non-volatile memory 58 and returning the requested number of bytes (received in the data field) that are presently stored at the received address.

If the request was not a read request, the process similarly continues to step 120 wherein the microprocessor 64 compares the request against an erase request (04h). If the received type field 76 equals 04h, then the contents of the memory are erased at step 122, which provides a rapid way in which to erase potentially significant amounts of data.

Finally, if it is not an erase request (04h), the type is compared against a status request, or hexadecimal 05h. Although not presently active, this value is reserved such that when field 76 equals 05h, agreed-upon status information will be returned at step 126. If it is not equal to 05h, then an error is assumed since the received record type has not been recognized, and at step 128 a negative acknowledge is returned.

In this manner, the system controller 40 is operably connected to the memory 58 of the hot-half 24. However, the memory 58 remains attached to the hot-half 24, and not solely with the system controller 40 or a removable type of media, thus eliminating the aforementioned drawbacks associated therewith.

Figure 6A:
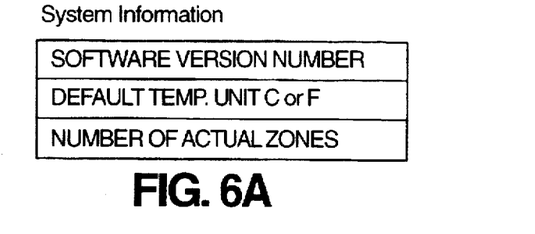
FIGS. 6A, 6B, and 6C comprise a diagram illustrating the structure of the memory in the hot-half for storing information including operating parameters and historical information.
Figure 6B:
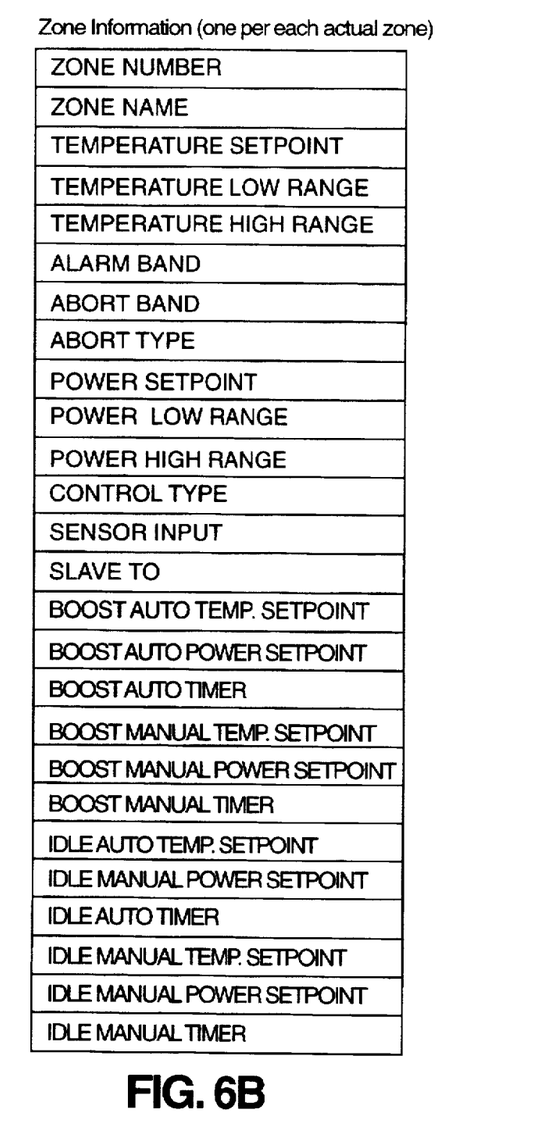
Figure 6C:
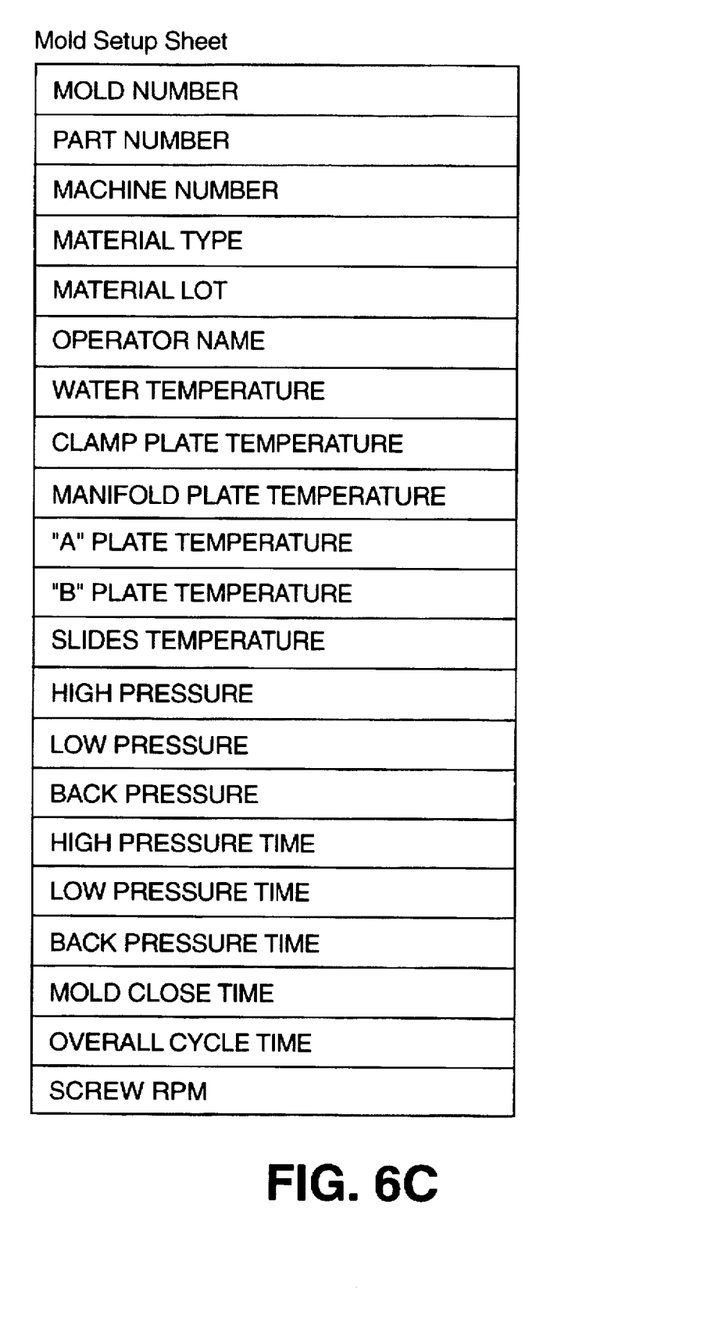

FIGS. 6A–6C illustrate the organization of the non-volatile memory 58 which is effectively replicated in the RAM (not shown) of the system controller 40 for controlling the molding operation. As can be appreciated, because the system controller 40 has its own memory, if desired it is able to control the molding operation independent of the contents of the non-volatile memory 58. For example, if the non-volatile memory 58 is not responding properly or otherwise does not contain the desired information (such as during its initial run or if erased), the memory in the system controller 40 may be manually set up with the molding parameters, although each zone will probably have to be set up individually in the conventional, time-consuming manner. In order to reduce the risk of losing set-up data in the non-volatile memory 58, the system controller 40 may be configured to keep one or more back-up copies of data contained in the non-volatile memory 58.

Figure 7:
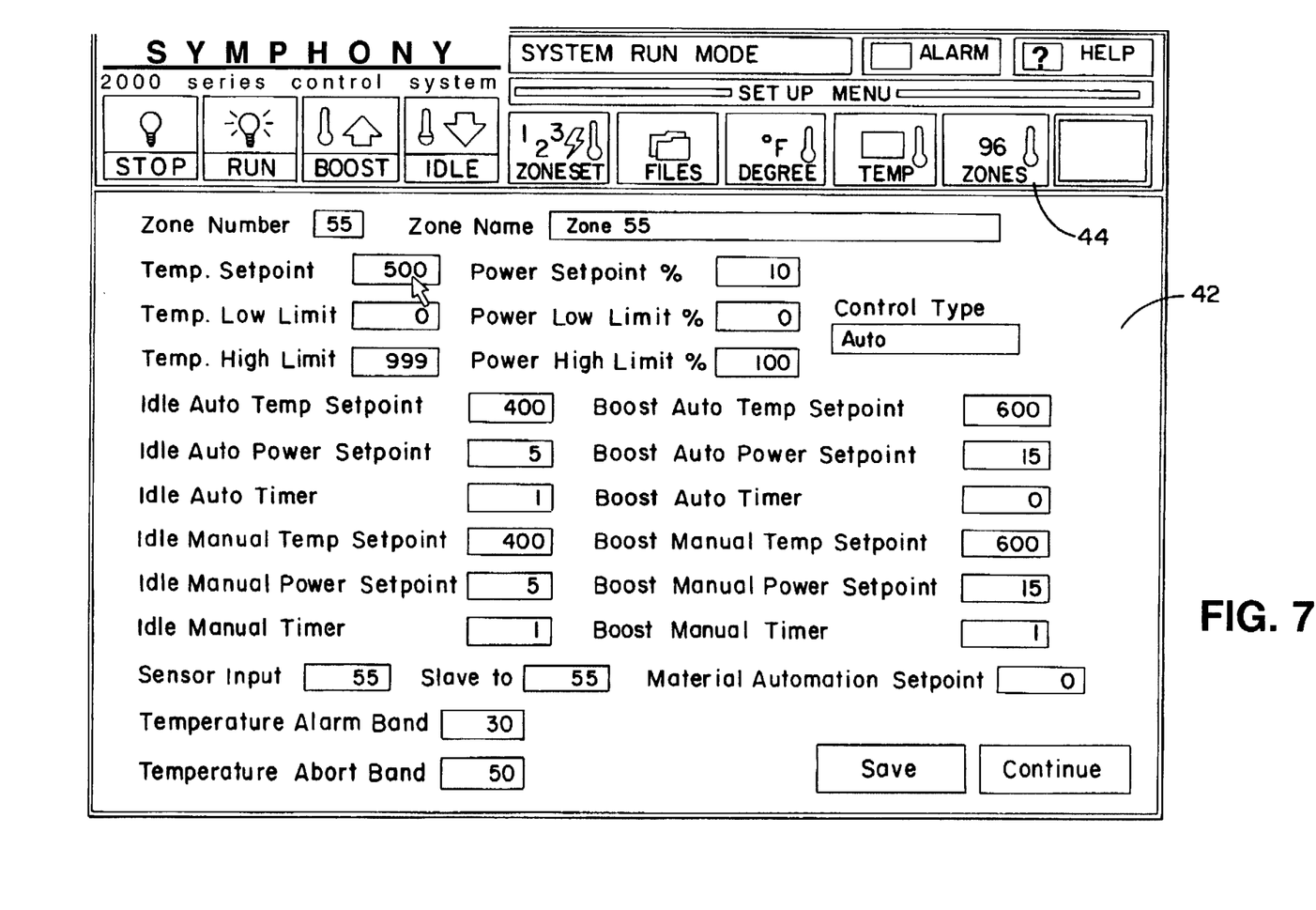
FIG. 7 is a representation of a system controller screen from which the parameters in the hot-half memory may be displayed or edited.

FIG. 6A illustrates the general system information that is stored with each hot-half 24 according to the invention, including one location reserved for maintaining the number of actual zones. FIG. 6B represents the zone information for each zone that is present in the hot-half, i.e., wherein a heater 30 and (optionally) a thermocouple 36 are present. For example, the temperature setpoint for the given zone is stored at this location. When this information is loaded to the system controller 40, it is available on the display screen 42 thereof for review, or editing via the touch screen input device 44, as shown in FIG. 7.

Historical molding information for the operation is also preserved in the memory 58 as shown in FIG. 6C, below the data for the numerous zones. This provides an operator with information from the previous molding operation which may be pertinent to the present operation. Although at present this setup sheet information is only available to the operator for convenience in fine-tuning the present setup, it is feasible that this information may be automatically processed by the system controller 40 to make or suggest adjustments to the current settings based on the previous history. Moreover, if sufficient memory is available, a number of setup sheets corresponding to a number of previous operations may be preserved.

In a typical operation, once connected to the hot-half 24, the system controller 40 will transmit one or more read requests to the communications circuitry 60 in the hot-half 24, which will respond by returning data to the system controller 40. In this manner, the initial settings and historical information are loaded into the system controller 40. After a review by the operator, test molding and the adjustment process based thereon is begun. Any operation-specific information known to the system controller 40, e.g., pressure settings, is transferred back to the hot-half 24 for storage in the system information (FIG. 6A) or mold setup sheet (FIG. 6C) locations in the non-volatile memory 58. Any adjustments made to the zone settings, such as via the editing screen shown in FIG. 7, are dynamically transferred back to the hot-half for storage in the appropriate zone location (e.g., FIG. 6B) in the non-volatile memory 58. In this manner, the most-recent information is kept with the mold for the subsequent use thereof. Of course, if desired, the adjustments may be selectively, rather than dynamically transmitted to the hot-half by providing an appropriate write prompt or the like at the system controller display screen 42 before the transmission occurs.

As can be seen from the foregoing detailed description there is provided an improved apparatus and method for controlling the temperature of a hot-half of a mold during the injection molding process which provides for more reliable and simplified operation. The apparatus and method ensures that the most-recent temperature settings for a hot-half of a mold are easily retrieved at any time and at any place. Updated temperature settings for a hot-half of a mold are automatically memorized and can be retrieved for subsequent uses of the mold. The apparatus and method creates a history of the mold usage and records the most-recent temperature settings for the hot-half of the mold that can be easily accessed wherever the mold is used, regardless of its location and the time of its use.

Problems that occur from mismatching or losing the data for the corresponding mold are thereby eliminated.

What is claimed is:

1. A method of controlling the temperature of the material at least one location in a hot-half of a mold, comprising the steps of:

coupling a system controller to the hot-half of the mold to provide a communication path therebetween and to provide power from the system controller to at least one heating element in the hot-half;

communicating to the system controller temperature data along the communication path from a memory housed at and mounted to the hot-half;

providing a controlled amount of power from the system controller to the heating element in accordance with the temperature data communicated to the system controller; and updating the temperature data via a user input at the system controller and communicating the updated temperature data to the memory via the communication path.

2. The method of claim 1 wherein the step of coupling a system controller to the hot-half of the mold includes the steps of selectively attaching via a junction box at the hot-half: 1) a source of power at the system controller to at least one heating element at the hot-half, 2) at least one thermocouple at the hot-half to the system controller, and 3) a communications medium between the system controller and the memory at the hot-half.

3. The method of claim 1 wherein the step of communicating to the system controller the temperature data includes the steps of formatting at least one data record at the hot-half having the stored temperature data therein and transmitting the formatted data record to the system controller.

4. The method of claim 2 further comprising the steps of receiving the communicated data from the system controller at the hot-half and writing the received data to the non-volatile memory.

5. The method of claim 1 wherein the steps of updating temperature data via user input at the system controller and communicating the updated temperature data to the memory via the communication path include the steps of formatting the updated temperature data at the system controller into at least one formatted data record including a type field and data field, the data field having the updated temperature data therein, and transmitting the formatted data record to the hot-half.

6. The method of claim 5 further comprising the steps of providing error checking information in the formatted data record transmitted by the system controller, receiving the data record at the hot-half, verifying the received data record against the error checking information therein, and returning a signal from the hot-half to the system controller indicative of the result of the verification.

7. An apparatus for providing material to a cold-half of a mold at a selected temperature, the apparatus comprising: a hot-half of the mold for mating with the cold-half, the hot-half including a flow passage for providing material to the mold when the hot-half is mated with the cold-half, a heater for elevating the temperature of the material at a selected location of the hot-half, a non-volatile memory for storing initial and historical information including data for controlling the temperature of the heater, a junction box mounted to the hot-half and including at least one connector in communication with the heater and the non-volatile memory; a connector extending from a system controller for connecting with the at least one connector of the junction box such that the hot-half is selectively attachable to the system controller; an input device for inputting current settings for a molding operation based on the initial historical information; a communications controller within the system controller for communicating with the memory of the hot-half to obtain the initial and historical information therein and for writing the current settings into the non-volatile memory in order to update the historical information, and the system controller further including a heater controller for outputting power signals to control the temperature of the heater in accordance with the information.

8. The apparatus of claim 1 further comprising communications circuitry at the hot-half and connected to the non-volatile memory therein for communicating information between the non-volatile memory and the communications controller at the system controller.

9. The apparatus of claim 8 wherein the communications circuitry at the hot-half includes means for formatting information in the non-volatile memory into data records, the data records hazing fields therein including record type fields and data fields, and means for evaluating record type fields received from the communications controller at the system controller, such that the communications circuitry at the hot-half communicates with the communications controller at the system controller by transmitting formatted data records therebetween.

10. The apparatus of claim 8 wherein the communications circuitry at the hot-half includes a transceiver for communicating with the system controller via an RS-232 communications protocol.

11. The apparatus of claim 7 wherein the non-volatile memory comprises an EEPROM.

12. The apparatus of claim 7 wherein the cold-half includes a plurality of molds therein and the flow passage includes a manifold for distributing the material to the molds.

13. The apparatus of claim 7 wherein the non-volatile memory comprises an EEPROM.

14. The apparatus of claim 7 wherein the cold-half includes a plurality of molds therein and the flow passageway includes a manifold for distributing the material to the molds.

15. A hot-half for a mold for mating with a cold-half of the mold, the hot-half comprising: a substrate shaped to mate with the cold-half in registration; a flow passageway for communicating liquefied material to the cold half; a heating element interposed in the flow passage way for heating the liquefied material; a junction box for coupling the heating element to an external source of power and control; and, a non volatile memory for storing initial and historical information indicative of an appropriate temperature setting for the heating element to produce products of a molding process performed by the hot and cold halves.

16. The apparatus of claim 15 further comprising communications circuitry at the hot-half for communicating the information indicative of an appropriate temperature setting for the heating element to the external source of power and control.

17. The apparatus of claim 16 wherein the communications circuitry at the hot-half includes means for formatting information in the non-volatile memory into data records, each data records having fields therein including a record type field and a data field, and means for evaluating received record type fields such that the communications circuitry communicates with the external source of power and control by transmitting formatted data records therebetween.

18. The apparatus of claim 16 wherein the communications circuitry at the hot-half includes a transceiver for communicating with the system controller via an RS-232 communications protocol.

* * * * *